(12) United States Patent
Tsujikawa et al.

(10) Patent No.: US 9,449,616 B2
(45) Date of Patent: Sep. 20, 2016

(54) NOISE REDUCTION SYSTEM, SPEECH DETECTION SYSTEM, SPEECH RECOGNITION SYSTEM, NOISE REDUCTION METHOD, AND NOISE REDUCTION PROGRAM

(71) Applicant: NEC Corporation, Minato-ku, Tokyo (JP)

(72) Inventors: Masanori Tsujikawa, Tokyo (JP); Ken Hanazawa, Tokyo (JP); Shuji Komeiji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/760,814

(22) PCT Filed: Dec. 25, 2013

(86) PCT No.: PCT/JP2013/007573
§ 371 (c)(1),
(2) Date: Jul. 14, 2015

(87) PCT Pub. No.: WO2014/112023
PCT Pub. Date: Jul. 24, 2014

(65) Prior Publication Data
US 2015/0356983 A1 Dec. 10, 2015

(30) Foreign Application Priority Data
Jan. 17, 2013 (JP) ................................. 2013-006044

(51) Int. Cl.
*G10L 21/00* (2013.01)
*G10L 25/84* (2013.01)
*G10L 21/0208* (2013.01)
*G10L 15/00* (2013.01)
*G10L 15/20* (2006.01)
*G10L 21/0216* (2013.01)

(52) U.S. Cl.
CPC ............ *G10L 25/84* (2013.01); *G10L 21/0208* (2013.01); *G10L 15/20* (2013.01); *G10L 2021/02165* (2013.01)

(58) Field of Classification Search
CPC ............................... G10L 25/84; G10L 15/20

USPC .......................... 704/208, 226, 233
See application file for complete search history.

(56) References Cited

FOREIGN PATENT DOCUMENTS

| JP | 6-67691 A | 3/1994 |
|----|-----------|--------|
| JP | 2000-163099 A | 6/2000 |
| JP | 2003-195882 A | 7/2003 |
| JP | 2006-163231 A | 6/2006 |
| JP | 2007-193517 A | 8/2007 |
| JP | 2009-75536 A | 4/2009 |
| JP | 2011-186384 A | 9/2011 |

OTHER PUBLICATIONS

International Search Report for PCT Application No. PCT/JP2013/007573, mailed on Apr. 8, 2014.
English translation for Written opinion of PCT Application No. PCT/JP2013/007573.

*Primary Examiner* — Thierry L Pham
(74) *Attorney, Agent, or Firm* — Sughrue Mion, PLLC

(57) ABSTRACT

Provided are a noise reduction system that highly precisely estimates noise contained in an input signal and highly precisely reduces the noise contained in the input signal using the estimated noise, a speech detection system, a speech recognition system, a noise reduction method, and a noise reduction program. The noise reduction system includes: a first noise estimating unit (111) that estimates a stationary noise component contained in a first input signal; a first noise reduction unit (121) that reduces the stationary noise component from the first input signal; a second noise estimating unit (112) that re-estimates a stationary noise component contained in the first input signal; a third noise estimating unit (113) that estimates a second non-stationary noise component including a sum of a stationary noise component and a non-stationary noise component contained in the first input signal; an estimated noise combining unit (114) that estimates a stationary noise component and a second non-stationary noise component contained in the first input signal; and a second noise reduction unit (122) that reduces the stationary noise component and the second non-stationary noise component contained in the first input signal.

20 Claims, 8 Drawing Sheets

NOISE REDUCTION SYSTEM, SPEECH DETECTION SYSTEM, SPEECH RECOGNITION SYSTEM, NOISE REDUCTION METHOD, AND NOISE REDUCTION PROGRAM

This application is a National Stage Entry of PCT/JP2013/007573 filed on Dec. 25, 2013, which claims priority from Japanese Patent Application 2013-006044 filed on Jan. 17, 2013, the contents of all of which are incorporated herein by reference, in their entirety.

TECHNICAL FIELD

The present invention relates to a noise reduction contained in a sound mixed with the noise, a speech detection system, a speech recognition system, a noise reduction method, and a noise reduction program, and in particular, to a noise reduction system capable of precisely reducing both stationary noise and non-stationary noise, a speech detection system, a speech recognition system, a noise reduction method, and a noise reduction program.

BACKGROUND ART

PTL 1 describes one example of a noise estimating system and a noise attenuation system that performs noise reduction using noise estimated by the noise estimating system. FIG. 8 is a block diagram illustrating a configuration of the noise estimating system described in PTL 1. As illustrated in FIG. 8, the noise estimating system described in PTL 1 includes a first noise estimating unit 611, a first noise attenuation unit 621, a sound pattern storage unit 631, a second noise attenuation unit 622, and a second noise estimating unit 612. The noise estimating system having such a configuration operates as follows.

The first noise estimating unit 611 estimates noise contained in an input signal and the first noise attenuation unit 621 reduces, from the input signal, a first noise estimated to obtain a first noise-attenuated signal. Using the first noise-attenuated signal and a sound pattern stored on the sound pattern storage unit 631, the second noise attenuation unit 622 obtains a second noise-attenuated signal. Using the second noise-attenuated signal, the second noise estimating unit 612 determines a second noise.

PTL 2 describes a technique for enhancing noise resistance in an environment where in addition to stationary noise, non-stationary noise such as sounds of a CD player or a radio exists.

CITATION LIST

Patent Literature

PTL 1: Publication of Japanese Patent Application No. 2007-193517
PTL 2: Japanese Laid-open Patent Publication No. 2006-163231

SUMMARY OF INVENTION

Technical Problem

The noise estimating system described in PTL 1 determines a noise-attenuated signal using a first noise estimated by the first noise estimating unit and re-estimates noise using the noise-attenuated signal. This makes it possible that the noise estimating system highly precisely estimates noise contained in an input signal, compared with the first noise. However, the noise estimating system produces the following problem.

The problem is that a noise component that is not contained in the first noise estimated by the first noise estimating unit, i.e., a component that is not regarded as noise by the first noise estimating unit is not contained either in a second noise that is an output of the second noise estimating unit.

When, for example, the first noise estimating unit estimates a stationary noise component (a noise component having a small time variation in an average value and a variance value of noises), a non-stationary noise component (a noise component having a large time variation in an average value and a variance value of noises) is not contained in a first noise and therefore, the non-stationary noise component remains in a noise-attenuated signal. As a result, in the same manner as the first noise, a non-stationary noise is not contained either in a second noise, and therefore, even when a noise-attenuated signal is calculated using the second noise, the non-stationary noise component remains in the noise-attenuated signal.

In view of above, the present invention has an object to provide a noise reduction system that highly precisely estimates noise contained in an input signal and highly precisely reduces the noise contained in the input signal using the estimated noise, a speech detection system, a speech recognition system, a noise reduction method, and a noise reduction program.

Solution to Problem

A noise reduction system according to the present invention includes: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; and a second noise reduction unit that reduces the stationary noise component and the second non-stationary noise component contained in the first input signal.

A speech detection system according to the present invention includes: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; a second noise reduction unit that outputs a second estimated sound in which the stationary noise component and the second non-stationary noise component are reduced from the first input signal; a normalizing unit that normalizes the second estimated sound from the second noise reduction unit using the second estimated noise from the second noise estimating unit or the first estimated noise from the first noise estimating unit; and a speech detection unit that detects a sound using the normalized sound from the normalizing unit.

A speech recognition system according to the present invention includes: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; a second noise reduction unit that outputs a second estimated sound in which the stationary noise component and the second non-stationary noise component are reduced from the first input signal; a normalizing unit that normalizes the second estimated sound from the second noise reduction unit using the second estimated noise from the second noise estimating unit or the first estimated noise from the first noise estimating unit; a speech detection unit that detects a sound using the normalized sound from the normalizing unit; and a speech recognition unit that recognizes a sound by receiving the first estimated sound from the first noise reduction unit and the detection result from the speech detection unit.

A speech recognition system according to the present invention includes: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; a second noise reduction unit that outputs a second estimated sound in which the stationary noise component and the second non-stationary noise component are reduced from the first input signal; a normalizing unit that normalizes the second estimated sound from the second noise reduction unit using the second estimated noise from the second noise estimating unit or the first estimated noise from the first noise estimating unit; a speech detection unit that detects a sound using the normalized sound from the normalizing unit; a third noise reduction unit that outputs a third estimated sound in which a stationary noise component is reduced from the first input signal using the first input signal and the second estimated noise from the second noise estimating unit; and a speech recognition unit that recognizes a sound by receiving the third estimated sound from the third noise reduction unit and the detection result from the speech detection unit.

A noise reduction method according to the present invention includes: estimating a stationary noise component contained in a first input signal; outputting a first estimated noise; outputting a first estimated sound in which the stationary noise component is reduced from the first input signal using the first input signal and the first estimated noise; re-estimating a stationary noise component contained in the first input signal using at least the first input signal and the first estimated sound; outputting a second estimated noise; estimating a second non-stationary noise component including a sum of a stationary noise component and a non-stationary noise component contained in the first input signal using the first input signal and a second input signal; outputting a third estimated noise; estimating a stationary noise component and a second non-stationary noise component contained in the first input signal using the second estimated noise and the third estimated noise; and reducing the stationary noise component and the second non-stationary noise component contained in the first input signal.

A noise reduction program according to the present invention causes a computer to execute: processing for estimating a stationary noise component contained in a first input signal and outputting a first estimated noise; processing for outputting a first estimated sound in which the stationary noise component is reduced from the first input signal using the first input signal and the first estimated noise; processing for re-estimating a stationary noise component contained in the first input signal using at least the first input signal and the first estimated sound and outputting a second estimated noise; processing for estimating a second non-stationary noise component including a sum of a stationary noise component and a non-stationary noise component contained in the first input signal using the first input signal and a second input signal and outputting a third estimated noise; processing for estimating a stationary noise component and a second non-stationary noise component contained in the first input signal using the second estimated noise and the third estimated noise; and processing for reducing the stationary noise component and the second non-stationary noise component contained in the first input signal.

Advantageous Effects of Invention

According to the present invention, it is possible to highly precisely estimate noise contained in an input signal and highly precisely reduce the noise contained in the input signal using the estimated noise. Specifically, a stationary noise component contained in a first input signal is highly precisely estimated using the first input signal; further a non-stationary noise component contained in the first input signal is estimated also using a second input signal; and the estimated stationary noise component and the estimated non-stationary noise component are combined and reduced from the first input signal, and thereby, noise contained in the first input signal can be highly precisely reduced.

DESCRIPTION OF PREFERRED EMBODIMENTS

Figure 1:
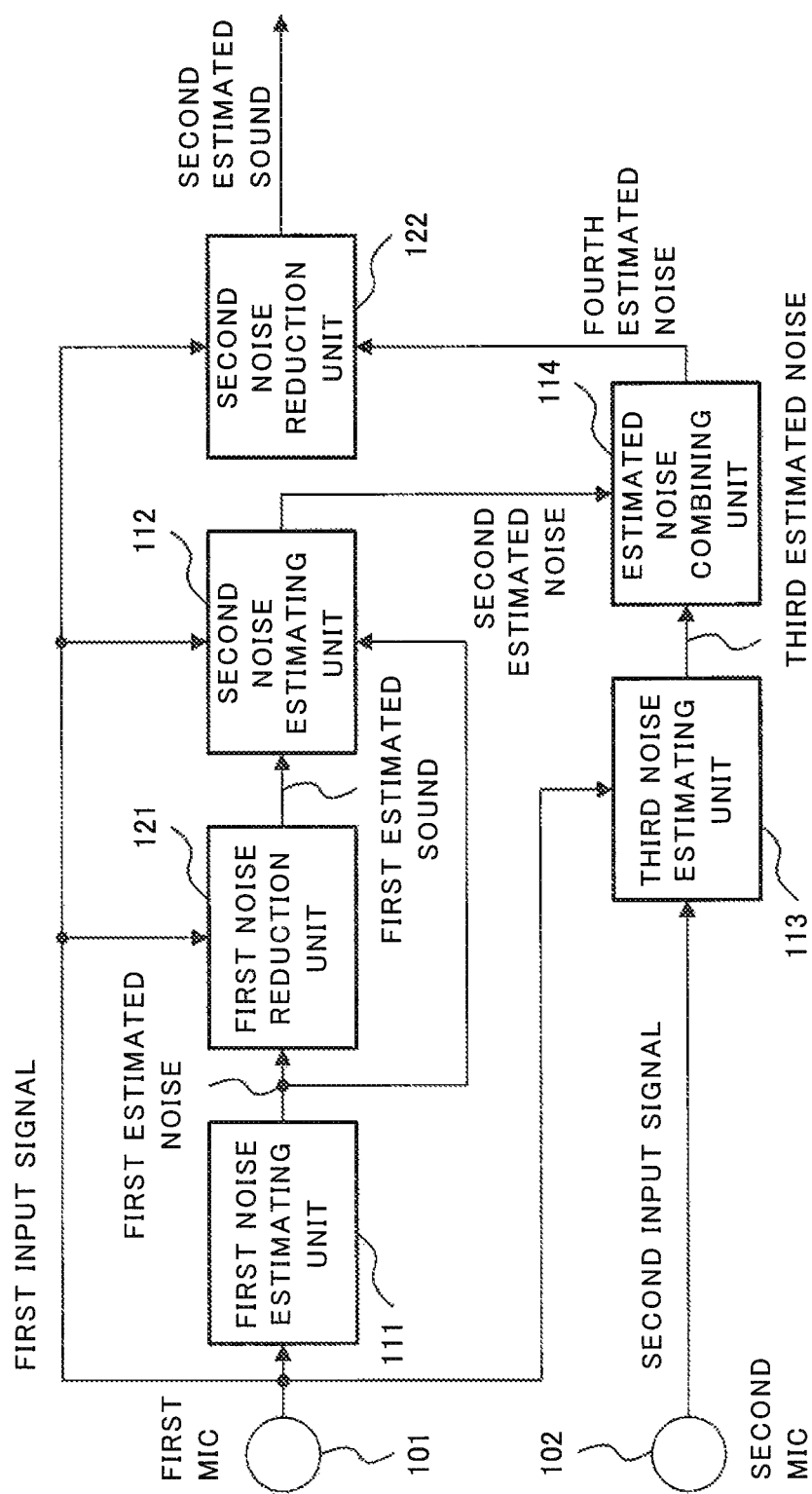
FIG. 1 is a block diagram illustrating a configuration of a noise reduction system of a first exemplary embodiment of the present invention.

Exemplary Embodiment 1
A first exemplary embodiment of the present invention will be described with reference to the drawings.
FIG. 1 is a block diagram illustrating a configuration of a noise reduction system of the first exemplary embodiment of the present invention.
As illustrated in FIG. 1, the noise reduction system includes a first microphone (hereinafter, referred to as a mic) 101, a second mic 102, a first noise estimating unit 111, a second noise estimating unit 112, a third noise estimating unit 113, an estimated noise combining unit 114, a first noise reduction unit 121, and a second noise reduction unit 122.
The first mic 101 outputs a signal (hereinafter, referred to as a first input signal) based on an input sound.
The first noise estimating unit 111 estimates a stationary noise component contained in the first input signal and outputs a first estimated noise.
The first noise reduction unit 121 reduces the stationary noise component contained in the first input signal using the first input signal and the first estimated noise obtained in the first noise estimating unit 111. The first noise reduction unit 121 outputs the first input signal in which the stationary noise component is reduced as a first estimated sound.

The second noise estimating unit 112 re-estimates a stationary noise component contained in the first input signal using at least the first input signal and the first estimated sound obtained in the first noise reduction unit 121 and outputs a second estimated noise.

The second mic 102 outputs a signal (hereinafter, referred to as a second input signal) based on an input sound.

The third noise estimating unit 113 estimates a non-stationary noise component contained in the first input signal using the first input signal and the second input signal and outputs a third estimated noise.

The estimated noise combining unit 114 estimates a stationary noise component and a non-stationary noise component contained in the first input signal using the second estimated noise from the second noise estimating unit 112 and the third estimated noise from the third noise estimating unit 113 and outputs a fourth estimated noise.

The second noise reduction unit 122 reduces the stationary noise component and the non-stationary noise component contained in the first input signal using the first input signal and the fourth estimated noise obtained in the estimated noise combining unit 114.

The first noise estimating unit 111, the second noise estimating unit 112, the third noise estimating unit 113, the estimated noise combining unit 114, the first noise reduction unit 121, and the second noise reduction unit 122 are realized, for example, using a computer operating in accordance with a noise reduction program. In this case, the CPU reads the noise reduction program and operates, in accordance with the program, as the first noise estimating unit 111, the second noise estimating unit 112, the third noise estimating unit 113, the estimated noise combining unit 114, the first noise reduction unit 121, and the second noise reduction unit 122. Further, the first noise estimating unit 111, the second noise estimating unit 112, the third noise estimating unit 113, the estimated noise combining unit 114, the first noise reduction unit 121, and the second noise reduction unit 122 may be realized using separated pieces of hardware.

Next, with reference to FIG. 1 and FIG. 2, an operation of the noise reduction system will be described.

Figure 2:
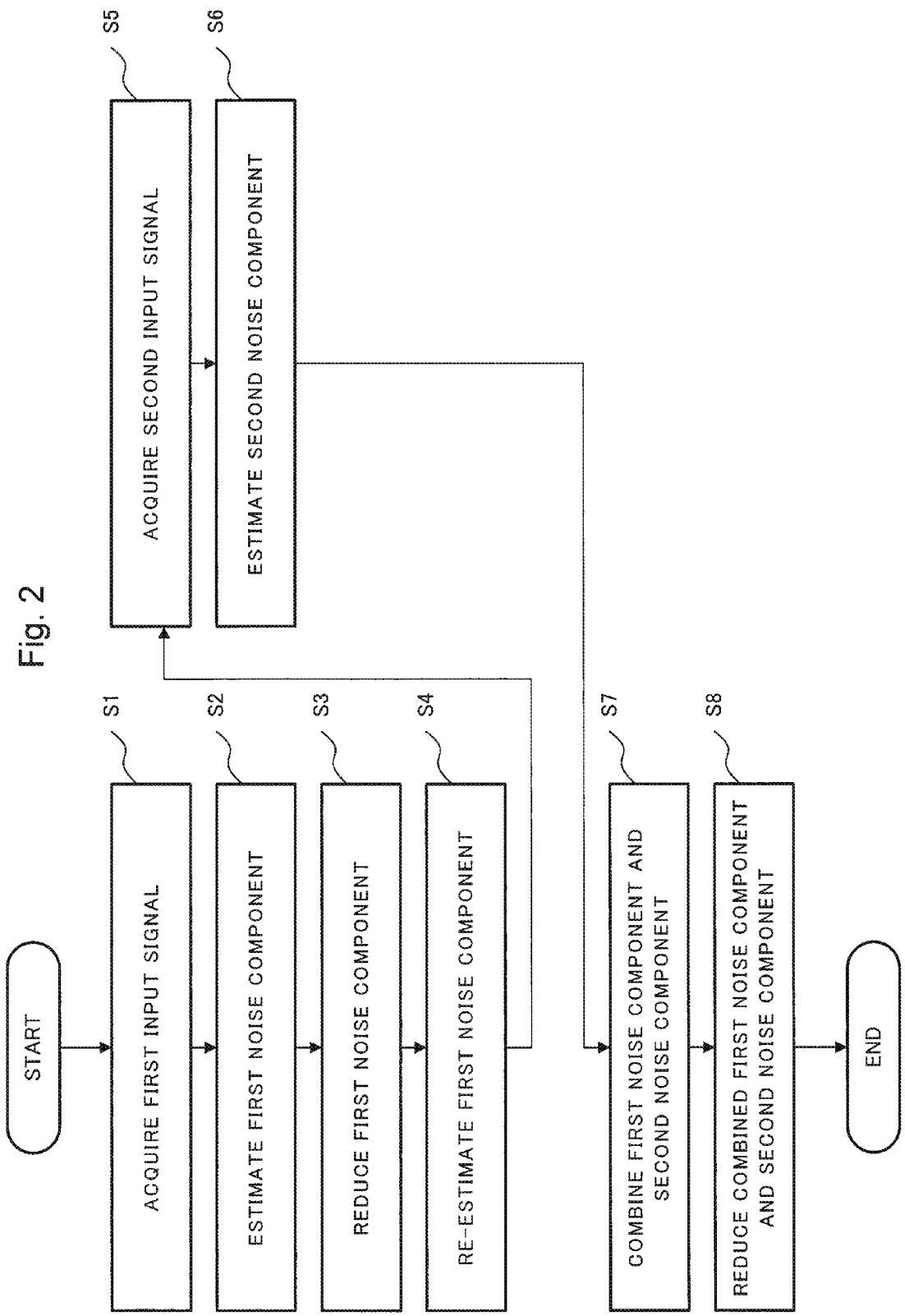
FIG. 2 is a flowchart illustrating processing of the noise reduction system of the first exemplary embodiment of the present invention.

FIG. 2 is a flowchart illustrating processing of the noise reduction system of the first exemplary embodiment of the present invention.

A frequency spectrum of a sound signal is designated as $S(f,t)$ and a frequency spectrum of a noise signal is designated as $N(k,f,t)$. A frequency spectrum $X1(f,t)$ of a first input signal that is an output of the first mic 101 and a frequency spectrum $X2(f,t)$ of a second input signal that is an output of the second mic 102 are modeled using Equation 1 and Equation 2, respectively. The sign f represents an index of frequency. The sign t represents an index of time. The sign k represents an index of a noise source. It is assumed that K noise sources exist. The frequency spectrum is dealt with as a power spectrum or an amplitude power spectrum unless otherwise specified. Further, in the following equations, a multiplication sign "×" will be omitted in some cases.

$$X1(f,t)=S(f,t)+\Sigma_{k=1}^{K}H(k,f,t)N(k,f,t) \quad \text{(Equation 1)}$$

$$X2(f,t)=H0(f,t)S(f,t)+\Sigma_{k=1}^{K}N(k,f,t) \quad \text{(Equation 2)}$$

wherein $H0(k,t)$ represents a frequency spectrum of a path difference upon transmission of a sound signal $S(f,t)$ to the first mic 101 and the second mic 102, H(k,f,t) represents a frequency spectrum of a path difference upon transmission of a noise signal N(k,f,t) of a noise source k to the second mic 102 and the first mic 101, and $\Sigma\_\{x=\text{lower limit}\}^{\{\text{upper limit}\}} f(x)$ represents a sum of f(x) upon changing a variable x from a lower limit to an upper limit.

A reduction target in the noise reduction system of the present invention is a noise signal contained in a first input signal X1(f,t), i.e., the second term $\Sigma\_\{k=1\}^{\{K\}} H(k,f,t)N(k,f,t)$ of Equation 1. The noise of the reduction target of Equation 1 is rewritten using a frequency spectrum Ns(f,t) of stationary noise that is a first noise component and a frequency spectrum Nn(f,t) of non-stationary noise that is a second noise component and further rewritten by dividing the frequency spectrum Ns(f,t) of stationary noise into an average value thereof Nsm(f,t) and a difference Nsv(f,t) to obtain Equation 3 from Equation 1.

$$X1(f,t)=S(f,t)+Ns(f,t)+Nn(f,t)=S(f,t)+\{Nsm(f,t)+Nsv(f,t)\}+Nn(f,t) \quad \text{(Equation 3)}$$

The first noise estimating unit 111 acquires a first input signal represented by Equation 3 from the first mic 101 (step S1) and estimates a stationary noise component Ns(f,t) contained in the first input signal X1(f,t) (step S2).

As an example of an estimating method, it is assumed that as described below, in a predetermined time period (0<=t<initLen), the input signal X1(f,t) includes only a stationary noise component, and a value obtained by averaging (time-averaging) the input signal X1(f,t) is designated as a first estimated noise Ns'1(f,t).

$$Ns'1(f,t)=\text{ave}\_\{t\}[X1(f,t)] \quad (0<=t<\text{initLen})$$

wherein ave_{x}[f(x)] represents an operator for averaging f(x) with respect to x.

As another example of the estimating method of the first estimated noise Ns'1(f,t), there is a method in which a histogram of the input signal X1(f,t) is prepared and a minimum value thereof is designated as the first estimated noise Ns'1(f,t). Alternatively, there is a method for estimating the first estimated noise Ns'1(f,t) using the estimating method described in Japanese Laid-open Patent Publication No. 2002-204175.

The first noise estimating unit 111 may estimate the first estimated noise Ns'1(f,t) using a method different from the examples.

After the first noise estimating unit 111 has calculated the first estimated noise Ns'1(f,t), the first noise reduction unit 121 determines a first estimated sound S'1(f,t) (step S3). One example of an estimating method of the first estimated sound S'1(f,t) is described below.

$$S'1(f,t)=W(f,t)X1(f,t)$$

$$W(f,t)=S''1(f,t)/\{S''1(f,t)+Ns'1(f,t)\}$$

$$S''1(f,t)=0.98 \times S''1(f,t-1)+0.02 \times \max[X1(f,t)-Ns'1(f,t),0]$$

As another example of the estimating method of the first estimated sound S'1(f,t), there is a method in which S''1(f,t) is substituted into the first estimated sound S'1(f,t). Alternatively, there is a method in which in the same manner as the method described in PTL 1, after S''1(f,t) has been corrected using a sound pattern previously learned, W(f,t) is calculated and X1(f,t) is multiplied by the calculated value to estimates'1(f,t). Alternatively, there is a method in which S''1(f,t) is corrected using a sound pattern and substituted into S'1(f,t) as a first estimated sound.

The first noise reduction unit 121 may estimate the first estimated sound S'1(f,t) using a method different from the examples.

After the first noise reduction unit 121 has calculated the first estimated sound S'1(f,t), the second noise estimating unit 112 determines a second estimated noise Ns'2(f,t) using at least the first input signal X1(f,t) and the first estimated sound S'1(f,t) (step S4). One example of an estimating method of the second estimated noise Ns'2(f,t) is described below.

$$Ns'2(f,t)=X1(f,t)-S'1(f,t)$$

Further, the second noise estimating unit 112 may estimate the second estimated noise Ns'2(f,t) using the first estimated noise Ns'1(f,t) in addition to the first input signal X1(f,t) and the first estimated sound S'1(f,t).

As another example of the estimating method of the second estimated noise Ns'2(f,t), there is a method for determining the second estimated noise Ns'2(f,t) as described below.

$$Ns'2(f,t)=WI(f,t)X1(f,t)$$

$$WI(f,t)=Ns'1(f,t)/\{S'1(f,t)+Ns'1(f,t)\}$$

or $$WI(f,t)=1-S'1(f,t)/\{S'1(f,t)+Ns'1(f,t)\}$$

The second noise estimating unit 112 may estimate the second estimated noise Ns'2(f,t) using a method different from the examples.

The second noise estimating unit 112 uses the first estimated sound S'1(f,t) in addition to the first input signal X1(f,t) and thereby, can highly precisely estimate the stationary noise component Ns(f,t) contained in X1(f,t), compared with the first estimated noise Ns'1(f,t). Particularly, the second noise estimating unit 112 can estimate not only the average value Nsm(f,t) of stationary noise components but also Nsv(f,t) that is a difference between Ns(f,t) and Nsm(f,t) indicated in Equation 3. The reason is that when the first estimated noise Ns'1(f,t) is sufficiently larger than the first estimated sound S'1(f,t), WI(f,t) takes a value close to 1 and the first input signal X1(f,t) containing Nsv(f,t) is multiplied by the WI(f,t) to obtain the second estimated noise Ns'2(f,t). However, no non-stationary noise component Nn(f,t) is contained in the second estimated noise Ns'2(f,t). The reason is that in the first estimated noise Ns'1(f,t), a non-stationary noise component is not regarded as noise.

The third noise estimating unit 113 acquires a second input signal from the second mic 102 (step S5) and determines a third estimated noise Nn'1(f,t) using the first input signal X1(f,t) and the second input signal X2(f,t) (step S6).

$$Nn'1(f,t)=H'(f,t)X2(f,t)$$

$$H'(f,t)=\text{ave}\_\{t\}[X1(f,t)]/\text{ave}\_\{t\}[X2(f,t)]$$

wherein H'(f,t) is an estimated value of H(k,f,t) contained in Equation 1 and may be estimated using a method other than the method described in the example. When a value of H'(f,t) can be determined in advance, this value is usable.

The third estimated noise Nn'1(f,t) contains a non-stationary noise component that is not contained in the second estimated noise Ns'2(f,t). However, with regard to a stationary noise component contained in the first input signal from the first mic 101, the second estimated noise Ns'2(f,t) estimated by including also the difference Nsv(f,t) between Ns(f,t) and an average value thereof Nsm(f,t) is more precise than the third estimated noise Nn'1(f,t) based on the second input signal.

The estimated noise combining unit 114 highly precisely estimates stationary noise and non-stationary noise contained in the first signal, using the second estimated noise Ns'2(f,t) output from the second noise estimating unit 112 and the third estimated noise Nn'1(f,t) output from the third noise estimating unit 113 (step S7). The estimated noise combining unit 114 outputs the noise as a fourth estimated noise N'(f,t).

$$N'(f,t) = (1-\alpha(f,t))\{\beta s(f,t)Ns'2(f,t)\} + \alpha(f,t)\{\beta n(f,t)Nn'1(f,t)\}$$

wherein α(f,t) represents a coefficient (hereinafter, referred to as a mixing coefficient) for controlling mixing of βs(f,t)Ns'2(f,t) and βn(f,t)Nn'1(f,t), βs(f,t) represents a coefficient (hereinafter, referred to as an adjustment coefficient) for fine-tuning an estimated value Ns'2(f,t) of a stationary noise component, and βn(f,t) represents an adjustment coefficient for fine-tuning an estimated value Nn'1(f,t) of noise containing non-stationary noise. It is desirable for each of βs(f,t) and βn(f,t) to normally have a value of 1.0, but when noise is intended to be estimated to be excessively large, a value larger than 1.0 may be set and when being intended to be estimated to be excessively small, a value smaller than 1.0 may be set. The mixing coefficient α(f,t) may take a value close to 1.0 when non-stationary noise exists and may take a value close to 0.0 when no non-stationary noise exists, as described below, for example.

$$\alpha(f,t) = 1.0 \text{ for } \beta s(f,t)Ns'2(f,t) < \beta n(f,t)Nn'1(f,t)$$

$$\alpha(f,t) = 0.0 \text{ for } \beta s(f,t)Ns'2(f,t) >= \beta n(f,t)Nn'1(f,t)$$

However, in this case, when an operation max[ ] that takes a maximum value is used, the fourth estimated noise N'(f,t) is as follows.

$$N'(f,t) = \max[\beta s(f,t)Ns'2(f,t), \beta n(f,t)Nn'1(f,t)]$$

As another example of the calculation method of α(f,t), there is a method for calculating α(f,t) so that as a value of βn(f,t)Nn'1(f,t) is larger than a value of βs(f,t)Ns'2(f,t), i.e., as a ratio {βn(f,t)Nn'1(f,t)/βs(f,t)Ns'2(f,t)} is larger, α(f,t) approaches 1.0, and as being smaller, α(f,t) approaches 0.0. As the calculation method of α(f,t), a method different from the examples is usable.

Lastly, the second noise reduction unit 122 reduces noise contained in the first input signal X1(f,t) using the fourth estimated noise N'(f,t) (step S8) and outputs the first input signal X1(f,t) in which the noise is reduced as a second estimated sound S'2(f,t). At that time, in the same manner as the first noise reduction unit 121, the second noise reduction unit 122 can use a method represented as the following example.

$$S'2(f,t) = W(f,t)X1(f,t)$$

$$W(f,t) = S''2(f,t)/\{S''2(f,t) + N'(f,t)\}$$

$$S''2(f,t) = 0.98 \times S''2(f,t-1) + 0.02 \times \max[X1(f,t) - N'(f,t), 0]$$

As another example of the estimating method of the second estimated sound S'2(f,t), there is a method in which S''2(f,t) is substituted into the second estimated sound S'2(f,t). Alternatively, in the same manner as the method described in PTL 1, after S''2(f,t) has been corrected using a sound pattern previously learned, W(f,t) is calculated and X1(f,t) is multiplied by the calculated value to estimates'2(f,t). Alternatively, there is a method in which S''2(f,t) is corrected using a sound pattern and substituted into S'2(f,t) as a second estimated sound.

The second noise reduction unit 122 may estimate the second estimated sound S'2(f,t) using a method different from the examples.

As described above, the present exemplary embodiment combines the second estimated noise Ns'2(f,t) that is a highly precisely estimated value of a stationary noise component and the estimated value Nn'1(f,t) of noise containing a non-stationary noise component based on the second input signal from the second mic. This makes it possible to highly precisely estimate a stationary noise component and a non-stationary noise component contained in the first input signal. Further, the present exemplary embodiment reduces noise from the first input signal based on the estimated stationary noise component and the estimated non-stationary noise component and therefore, can highly precisely reduce the noise.

A non-stationary noise component of a reduction target in the method described in PTL 2 is a reproduced sound of a CD player or the like (an echo from a speaker of the CD player or the like) input via a mic. The method described in PTL 2 estimates a non-stationary noise component using, as a reference signal, an electrical signal from a CD player or the like before being converted into a sound. Therefore, it is difficult to estimate and reduce a non-stationary noise component that is not contained in the reference signal.

In contrast, the present exemplary embodiment estimates a non-stationary noise component based on a sound signal input from a mic and therefore, a non-stationary noise component estimated by the third noise estimating unit 113 includes a stationary noise component and a non-stationary noise component that is not reproduced from a speaker, in addition to a non-stationary noise component reproduced from the speaker. In other words, the third noise estimating unit 113 estimates a non-stationary noise component (hereinafter, expressed as a second non-stationary noise component) including a sum of a stationary noise component and a non-stationary noise component. Therefore, according to the present exemplary embodiment, it is possible to reduce a stationary noise component and a non-stationary noise component that is not reproduced from a speaker, in addition to a non-stationary noise component reproduced from the speaker.

Exemplary Embodiment 2

A second exemplary embodiment of the present invention will be described with reference to the drawings.

Figure 3:
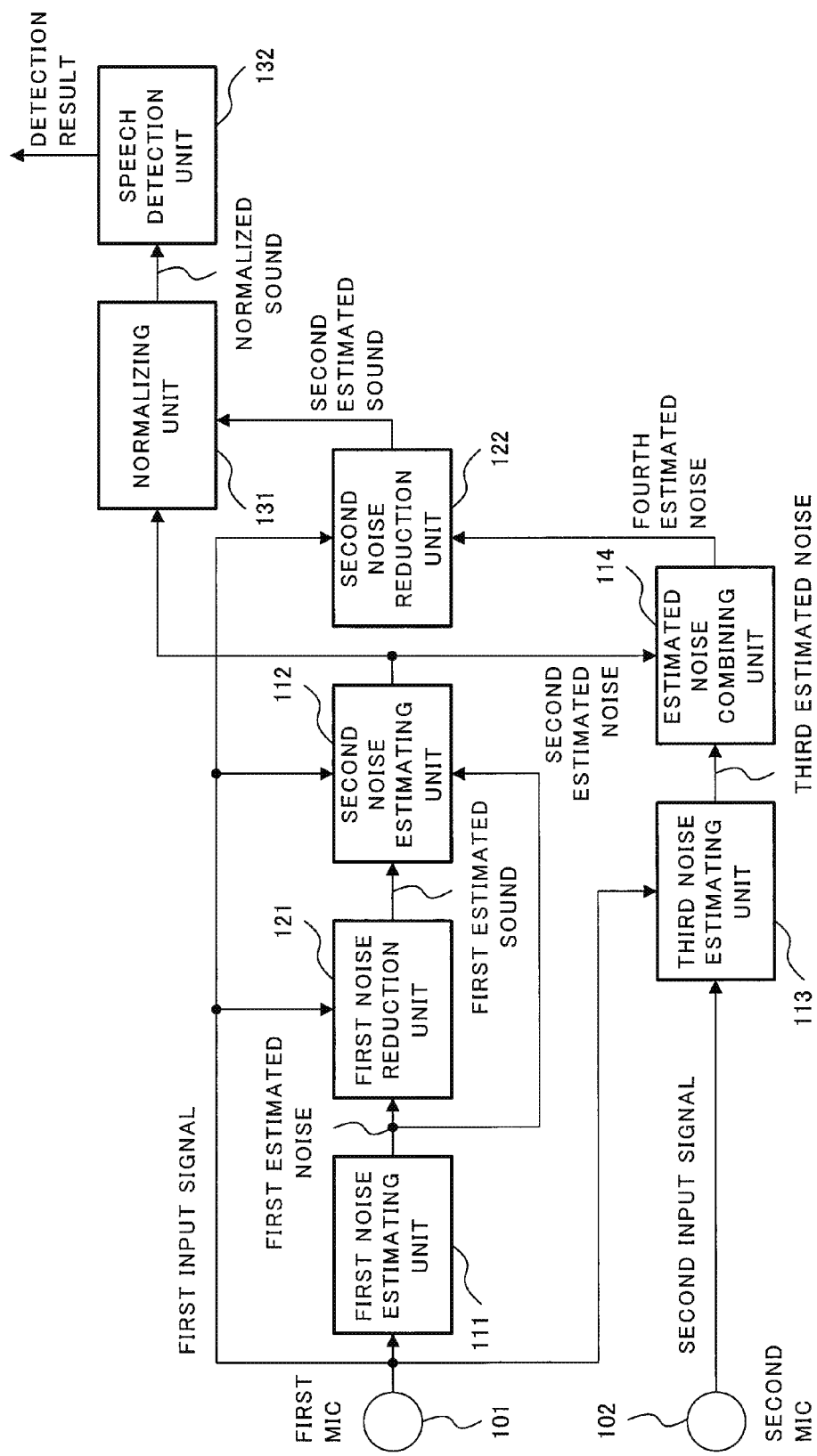
FIG. 3 is a block diagram illustrating a configuration of a speech detection system of a second exemplary embodiment of the present invention.
Figure 4:
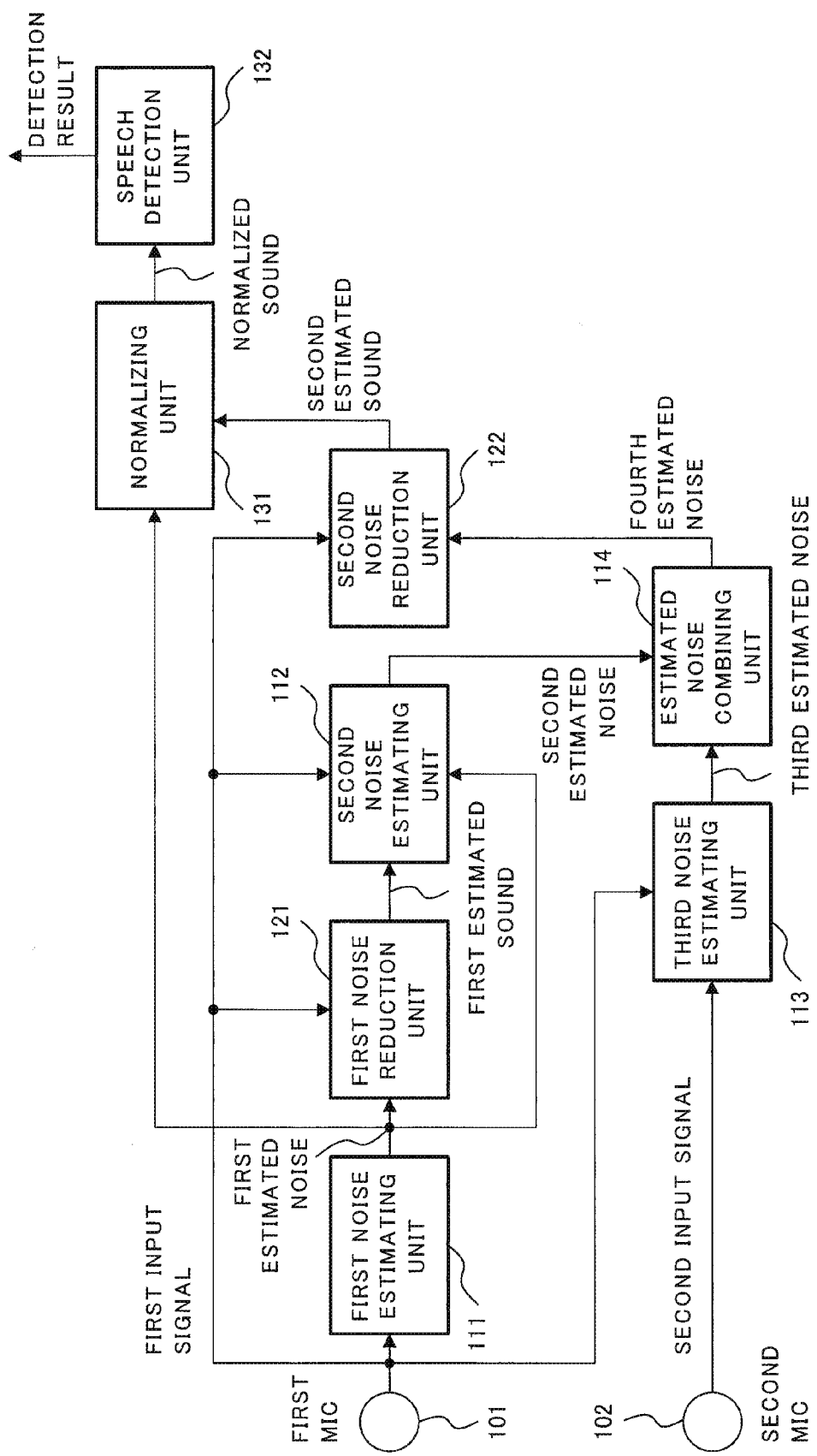
FIG. 4 is a block diagram illustrating another configuration of the speech detection system of the second exemplary embodiment of the present invention.

FIG. 3 is a block diagram illustrating a configuration of a speech detection system of the second exemplary embodiment of the present invention. FIG. 4 is a block diagram illustrating another configuration of the speech detection system of the second exemplary embodiment. The same reference sign as in FIG. 1 is assigned to the same configuration as in the first exemplary embodiment and therefore, description thereof will be omitted.

As illustrated in FIG. 3, the speech detection system includes a normalizing unit 131 and a speech detection unit 132, in addition to the configurations of the noise reduction system of the first exemplary embodiment.

The normalizing unit 131 normalizes the second estimated sound S'2(f,t) from the second noise reduction unit 122 using the second estimated noise Ns'2(f,t) from the second noise estimating unit 112.

The speech detection unit 132 detects a sound using the normalized sound from the normalizing unit 131.

In the second exemplary embodiment, the first noise estimating unit 111, the second noise estimating unit 112, the third noise estimating unit 113, the estimated noise combining unit 114, the first noise reduction unit 121, the second noise reduction unit 122, the normalizing unit 131, and the speech detection unit 132 are realized, for example, using a computer operating in accordance with a speech detection program. In this case, the CPU reads the speech detection program and operates, in accordance with the program, as the first noise estimating unit 111, the second noise estimating unit 112, the third noise estimating unit 113, the estimated noise combining unit 114, the first noise reduction unit 121, the second noise reduction unit 122, the normalizing unit 131, and the speech detection unit 132. Further, the first noise estimating unit 111, the second noise estimating unit 112, the third noise estimating unit 113, the estimated noise combining unit 114, the first noise reduction unit 121, the second noise reduction unit 122, the normalizing unit 131, and the speech detection unit 132 may be realized using separated pieces of hardware.

The other configurations and operations of the speech detection system are the same as the noise reduction system of the first exemplary embodiment. Therefore, the normalizing unit 131 and the speech detection unit 132 will be described.

The normalizing unit 131 normalizes the second estimated sound S'2(f,t) from the second noise reduction unit 122 using the second estimated noise Ns'2(f,t) from the second noise estimating unit 112 and outputs a normalized sound Sn'(f,t). Equation 4 represents one example of normalization of the second estimated sound S'2(f,t).

$$Sn'(f,t)=S'2(f,t)/Ns'2(f,t) \quad \text{(Equation 4)}$$

By being normalized as described above, the normalized sound Sn'(f,t) has an unchanged value even when, for example, a sensitivity of the first mic 101 is different and a sound volume of the first input signal varies. In other words, when a sound is detected using Sn'(f,t), a detection threshold is easily set. Further, when the first term H0(f,t)S(f,t) (hereinafter, referred to as a crosstalk) of the right side of the second input signal indicated by Equation 2 is non-negligible, normalization is performed using the second estimated noise Ns'2(f,t) containing no crosstalk instead of the fourth estimated noise N'(f,t) and thereby, Sn'(f,t) have a larger value in a sound interval. In other words, when a sound is detected using Sn'(f,t), the sound interval is highly precisely detectable.

In Equation 4, normalization is performed for each of an index f of frequency and an index t of time and a normalized sound is output, but averaging may be performed in terms of frequency or time. Further, as illustrated in FIG. 4, the normalizing unit 131 may input the first estimated noise Ns'1(f,t) containing no crosstalk similarly, instead of the second estimated noise Ns'2(f,t) and perform normalization using the first estimated noise Ns'1(f,t).

Further, as represented in the following equations, the second estimated noise Ns'2(f,t) and the first estimated noise Ns'1(f,t) used for normalization may be mixed with a minute amount of non-stationary noise. In other words, the second estimated noise Ns'2(f,t) and the first estimated noise Ns'1(f,t) mixed with the minute amount of non-stationary noise may be used for normalization.

$$Ns'2(f,t)=(1-\gamma(f,t))Ns'2(f,t)+\gamma(f,t)Nn'1(f,t)$$

$$Ns'1(f,t)=(1-\gamma(f,t))Ns'1(f,t)+\gamma(f,t)Nn'1(f,t)$$

wherein γ(f,t) represents a coefficient for controlling a degree of mixing of non-stationary noise into Ns'2(f,t) or Ns'1(f,t) and is a positive number smaller than 1. Upon use of Ns'2(f,t), for example, when setting is performed as γ(f,t)=0.01, non-stationary noise contained in Nn'1(f,t) is mixed into N'2(f,t) at 1%. When a minute amount of non-stationary noise remains in S'2(f,t) of Equation 4 due to a minute estimating error of the non-stationary noise, non-stationary noise is mixed into N'2(f,t) at 1% and thereby, an adverse effect of the minute amount of the non-stationary noise remaining in S'2(f,t) can be reduced. Especially when stationary noise is much smaller than non-stationary noise, an adverse effect of a minute amount of remaining non-stationary noise is large and therefore, an advantageous effect of mixing a minute amount of non-stationary noise is large. When the non-stationary noise is mixed, a minute amount of a crosstalk is mixed at the same time but an adverse effect thereof is small. With a decrease in frequency (f is small) making it more difficult to estimate non-stationary noise, γ(f,t) may be set as a larger value. Further, as stationary noise is smaller than non-stationary noise, a larger value is settable.

The speech detection unit 132 detects a sound using the normalized sound Sn'(f,t) from the normalizing unit 131 and outputs a detection result. An example of the detection result is described below.

Detection result=target sound interval for $Sn'(t) \geq Th$

Detection result=non-target sound interval for $Sn'(t) < Th$ wherein Sn'(t) represents a normalized sound calculated after averaging for the frequency f upon calculating Sn'(f,t). At a time t, a determination is performed as a target sound interval when Sn'(t) is larger than a threshold Th and as a non-target sound interval when being smaller than the threshold Th.

As described above, the present exemplary embodiment normalizes the second estimated sound S'2(f,t) in which noise is highly precisely reduced from the second noise reduction unit 122, using the second estimated noise Ns'2 (f,t) from the second noise estimating unit 112. Thereby, a threshold is easily set in the speech detection unit 132. Further, when a crosstalk is non-negligible, the present exemplary embodiment performs normalization using the second estimated noise Ns'2(f,t) containing no crosstalk, instead of the fourth estimated noise N'(f,t). Thereby, Sn'(f,t) has a larger value in a sound interval. In other words, when a sound is detected using Sn'(f,t), a sound interval is highly precisely detectable.

Exemplary Embodiment 3

A third exemplary embodiment of the present invention will be described with reference to the drawings.

Figure 5:
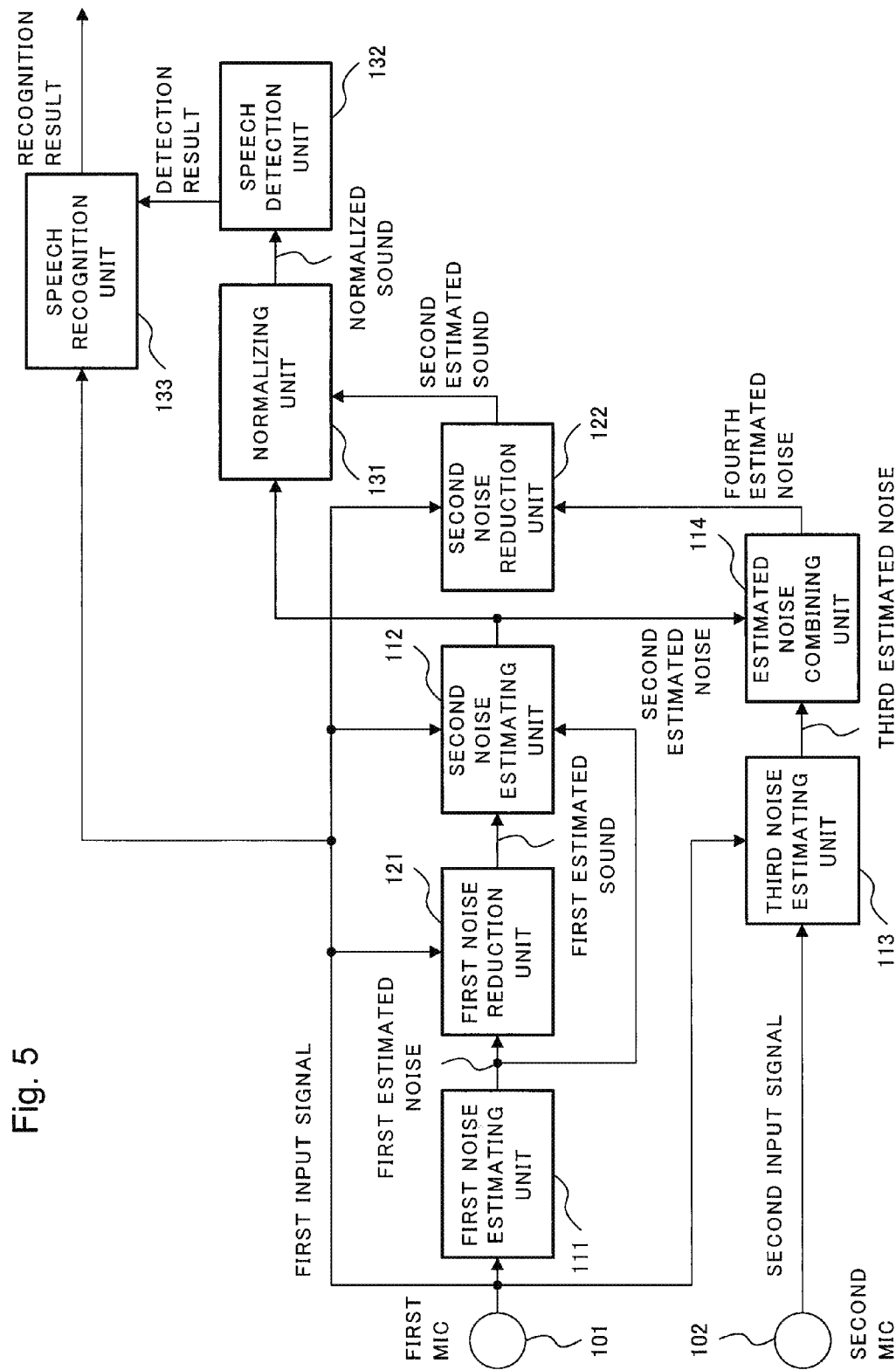
FIG. 5 is a block diagram illustrating a configuration of a speech recognition system of a third exemplary embodiment of the present invention.

FIG. 5 is a block diagram illustrating a configuration of a speech recognition system of the third exemplary embodiment of the present invention. The same reference sign as in FIG. 3 is assigned to the same configuration as in the second exemplary embodiment and therefore, description thereof will be omitted.

As illustrated in FIG. 5, the speech recognition system includes a speech recognition unit 133 in addition to the configurations of the speech detection system of the second exemplary embodiment.

The speech recognition unit 133 recognizes a sound by receiving the first estimated sound S'1(f,t) from the first noise reduction unit 121 and the detection result from the speech detection unit 132.

The other configurations and operations of the speech recognition system are the same as the speech detection system of the second exemplary embodiment. Therefore, the speech recognition unit 133 will be described.

The speech recognition unit 133 recognizes a sound by receiving the first estimated sound S'1(f,t) from the first noise reduction unit 121 and the detection result from the speech detection unit 132 and outputs a sound recognition result. When the received detection result indicates a target sound interval, the speech recognition unit 133 recognizes the first estimated sound S'1(f,t) from the first noise reduction unit 121.

When the first estimated sound S'1(f,t) affected by no crosstalk from the first noise reduction unit 121 is caused to be an input of the speech recognition unit 133 instead of the second estimated sound S'2(f,t) from the second noise reduction unit 122 in this manner, a decrease in sound recognition rate due to an adverse effect of a crosstalk becomes preventable.

Figure 6:
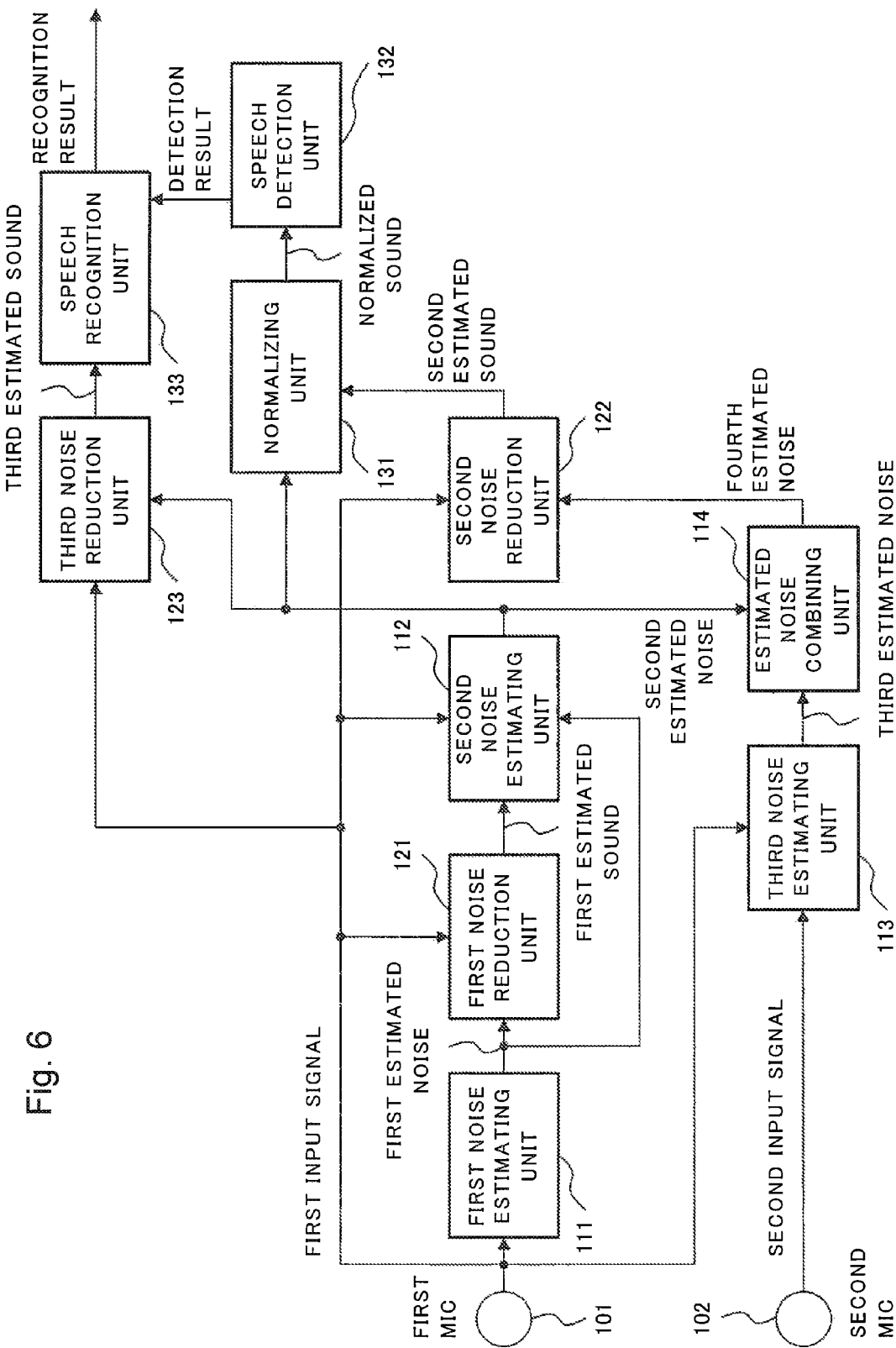
FIG. 6 is a block diagram illustrating another configuration of the speech recognition system of the third exemplary embodiment of the present invention.

Further, the speech recognition system may be configured as illustrated in FIG. 6. FIG. 6 is a block diagram illustrating another configuration of the speech recognition system of the third exemplary embodiment.

The speech recognition system illustrated in FIG. 6 includes a third noise reduction unit 123 in addition to the configurations of the speech recognition system illustrated in FIG. 5.

The third noise reduction unit 123 determines a third estimated sound using the same method as in the first noise reduction unit 121 and the second noise reduction unit 122, using the first input signal and the second estimated noise Ns'2(f,t) containing no crosstalk. Then, the third noise reduction unit 123 outputs the third estimated sound to the speech recognition unit 133.

When the third estimated sound affected by no crosstalk is caused to be an input of the speech recognition unit 133 in this manner, a decrease in sound recognition rate due to an adverse effect of a crosstalk becomes preventable in the same manner as in the system illustrated in FIG. 5.

As described above, the present exemplary embodiment recognizes a sound by receiving the first estimated sound S'1(f,t) from the first noise reduction unit 121 and the detection result from the speech detection unit 132 and outputs a sound recognition result. When a highly precise detection result from the speech detection unit 132 and the first estimated sound S'1(f,t) affected by no crosstalk from the first noise reduction unit 121 are caused to be an input of the speech recognition unit 133 in this manner, a high sound recognition rate becomes achievable.

In the third exemplary embodiment, the first noise estimating unit 111, the second noise estimating unit 112, the third noise estimating unit 113, the estimated noise combining unit 114, the first noise reduction unit 121, the second noise reduction unit 122, the normalizing unit 131, the speech detection unit 132, the speech recognition unit 133, and the third noise reduction unit 123 are realized, for example, using a computer operating in accordance with a speech recognition program. In this case, the CPU reads the speech recognition program and operates, in accordance with the program, as the first noise estimating unit 111, the second noise estimating unit 112, the third noise estimating unit 113, the estimated noise combining unit 114, the first noise reduction unit 121, the second noise reduction unit 122, the normalizing unit 131, the speech detection unit 132, the speech recognition unit 133, and the third noise reduction unit 123. Further, the first noise estimating unit 111, the second noise estimating unit 112, the third noise estimating unit 113, the estimated noise combining unit 114, the first noise reduction unit 121, the second noise reduction unit 122, the normalizing unit 131, the speech detection unit 132, the speech recognition unit 133, and the third noise reduction unit 123 may be realized using separated pieces of hardware.

EXAMPLE

The present invention will be described using a specific example but the scope of the present invention is not limited to the contents described below.

Figure 7:
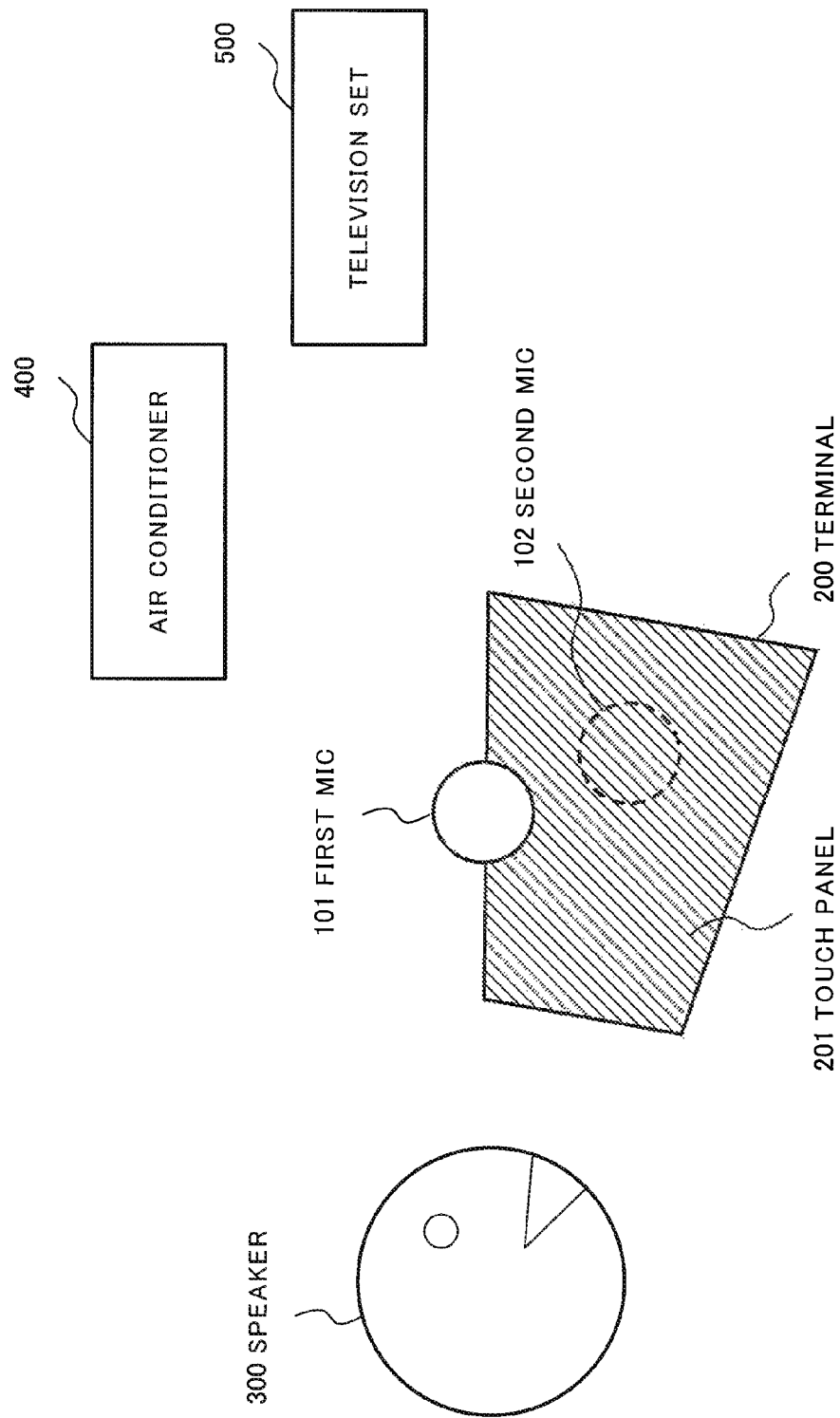
FIG. 7 is an illustration diagram illustrating an example of the speech recognition system according to the present invention.
Figure 8:
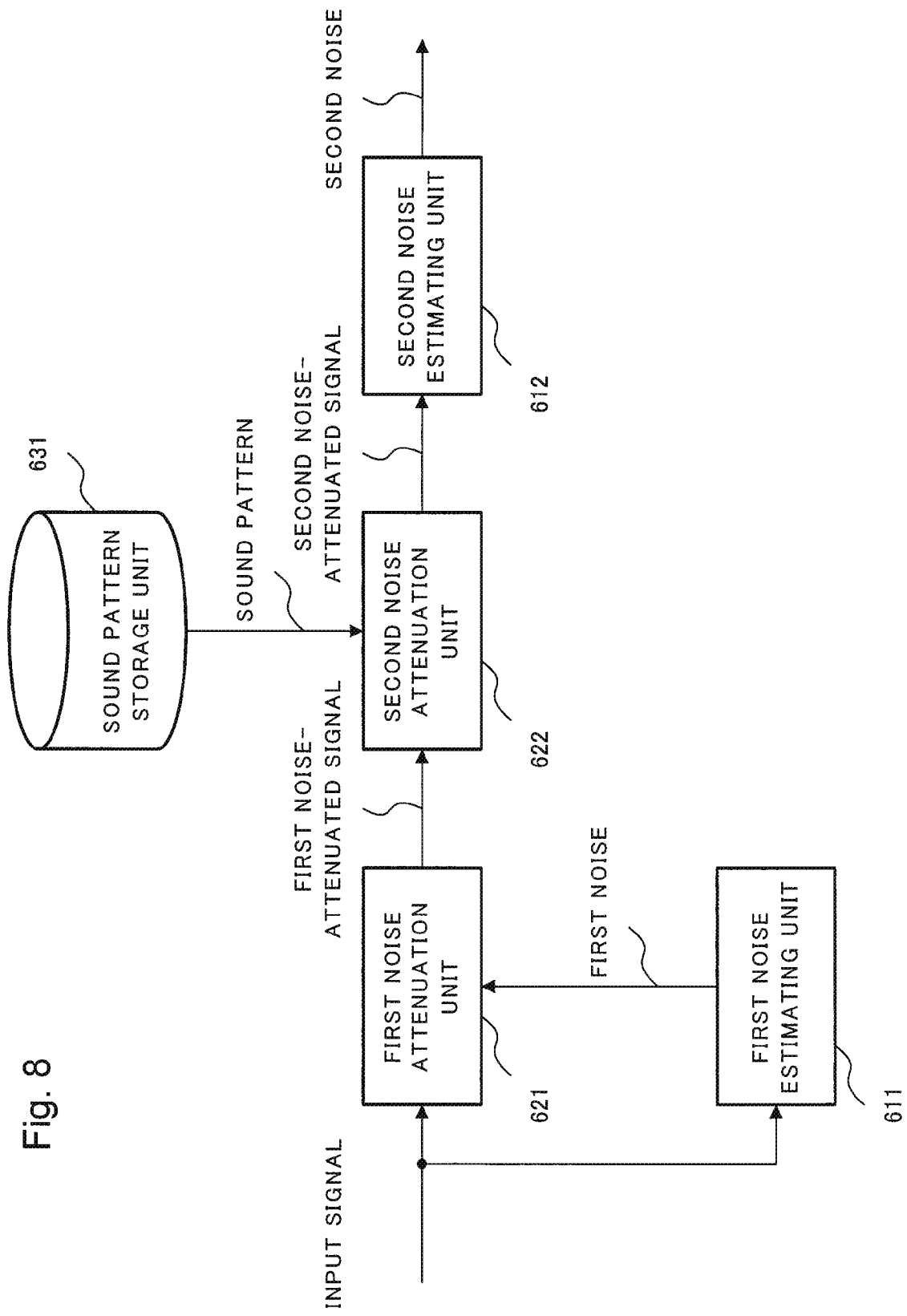
FIG. 8 is a block diagram illustrating a configuration of the noise estimating system described in PTL 1.

FIG. 7 is an illustration diagram illustrating an example of the speech recognition system according to the present invention.

A terminal 200 illustrated in FIG. 7 includes the speech recognition system according to the present invention. The terminal 200 is, for example, a tablet terminal and a speaker 300 operates a touch panel 201 disposed in the terminal 200. A side where the touch panel 201 is disposed is assumed as the surface of the terminal 200.

A sound produced by the speaker 300 is picked up by the first mic 101 and the second mic 102. It is desirable to dispose the first mic 101 and the second mic 102 so that the sound of the speaker is input to the first mic 101 in a larger extent. Therefore, in the present example, the first mic 101 is disposed on the surface of the terminal 200 as illustrated in FIG. 7. The second mic 102 is disposed on the rear side of the terminal 200 so that a direct sound in the sound of the speaker 300 is not input to the second mic 102.

In the example illustrated in FIG. 7, a direct sound in the sound of the speaker 300 is input to the first mic 101, but only a reflected sound and a diffracted sound are input to the second mic 102. Therefore, the sound of the speaker 300 is input to the first mic 101 in a larger extent. On the other hand, it is desirable to input noise from an air conditioner 400 and a television set 500 generating noise to the second mic 102 in a larger extent.

Even when stationary noise from the air conditioner 400 and non-stationary noise from the television set 500 are generated as in the present example, the speech recognition system according to the present invention can highly precisely recognize a sound. The reason is that as described above, the speech recognition system highly precisely estimates a stationary noise component and a non-stationary noise component contained in the first input signal output by the first mic 101 and reduces noise from the first input signal based on the stationary noise component estimated and the non-stationary noise component estimated.

In the present example and the third exemplary embodiment, a case in which the speech recognition system includes the first mic 101 and the second mic 102 has been described, but the speech recognition system may not include the first mic 101 or the second mic 102. For example, the mics included in the terminal 200 are usable as the first mic and the second mic. Further, also in the first exemplary embodiment and the second exemplary embodiment, in the same manner as above, the noise reduction system and the speech detection system may not include the first mic 101 or the second mic 102.

While the present invention has been described with reference to the exemplary embodiments and the example, it should be apparent that the present invention is not limited to only the configurations of the exemplary embodiments and is construed as including modifications and variations which can be made by those skilled in the art, without departing from the principles of the present invention.

The present invention is applicable to applications such as a noise reduction system capable of reducing noise contained in an input signal and a program for causing a computer to realize the noise reduction system.

A part or the whole of the exemplary embodiments can be described as the following supplementary notes but the present invention is not limited to the following.

(Supplementary Note 1)

A speech detection system including: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; a second noise reduction unit that reduces the stationary noise component and the second non-stationary noise component contained in the first input signal; a normalizing unit that normalizes a second estimated sound from the second noise reduction unit using the second estimated noise from the second noise estimating unit or the first estimated noise from the first noise estimating unit; and a speech detection unit that detects a sound using the normalized sound from the normalizing unit.

(Supplementary Note 2)

The speech detection system according to Supplementary Note 1, wherein the estimated noise combining unit estimates the stationary noise component and the second non-stationary noise component contained in the first input signal by multiplying the second estimated noise from the second noise estimating unit and the third estimated noise from the third noise estimating unit by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

According to such a configuration, it is possible that the second estimated noise and the third estimated noise are estimated to be excessively large or excessively small by adjusting the adjustment coefficients. Further, it is possible to estimate noise according to the extent that stationary noise and non-stationary noise exist, by controlling the mixing coefficients. Therefore, a sound interval is highly precisely detectable.

(Supplementary Note 3)

The speech detection system according to Supplementary Note 1, wherein the estimated noise combining unit estimates noise contained in the first input signal by multiplying the second estimated noise from the second noise estimating unit and the third estimated noise from the third noise estimating unit by adjustment coefficients, respectively, and selecting the second estimated noise multiplied by the adjustment coefficient or the third estimated noise multiplied by the adjustment coefficient, whichever larger in numerical value.

According to such a configuration, it is possible to estimate noise according to the extent that stationary noise and non-stationary noise exist, without using the mixing coefficients and therefore, a highly precise sound detection can be performed more easily.

(Supplementary Note 4)

The speech detection system according to any one of Supplementary Note 1 to Supplementary Note 3 further including: a first speech input device that outputs an input sound as the first input signal and a second speech input device that outputs an input sound as the second input signal, wherein a target sound for noise reduction input to the first speech input device is larger than a target sound for noise reduction input to the second speech input device.

According to such a configuration, it is possible to highly precisely detect a sound even when stationary noise from an air conditioner and non-stationary noise from a television set are generated.

(Supplementary Note 5)

A speech recognition system including: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; a second noise reduction unit that outputs a second estimated sound in which the stationary noise component and the second non-stationary noise component are reduced from the first input signal; a normalizing unit that normalizes the second estimated sound from the second noise reduction unit using the second estimated noise from the second noise estimating unit or the first estimated noise from the first noise estimating unit; a speech detection unit that detects a sound using the normalized sound from the normalizing unit; and a speech recognition unit that recognizes a sound by receiving the first estimated sound from the first noise reduction unit and the detection result from the speech detection unit.

(Supplementary Note 6)

The speech recognition system according to Supplementary Note 5, wherein the estimated noise combining unit estimates the stationary noise component and the second non-stationary noise component contained in the first input signal by multiplying the second estimated noise from the second noise estimating unit and the third estimated noise from the third noise estimating unit by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

According to such a configuration, it is possible that the second estimated noise and the third estimated noise are estimated to be excessively large or excessively small by adjusting the adjustment coefficients. Further, it is possible to estimate noise according to the extent that stationary noise and non-stationary noise exist, by controlling the mixing coefficients. Therefore, a sound interval is highly precisely detectable. This makes it possible to achieve a high sound recognition rate.

(Supplementary Note 7)

The speech recognition system according to Supplementary Note 5, wherein the estimated noise combining unit estimates noise contained in the first input signal by multiplying the second estimated noise from the second noise estimating unit and the third estimated noise from the third noise estimating unit by adjustment coefficients, respectively, and selecting the second estimated noise multiplied by the adjustment coefficient or the third estimated noise multiplied by the adjustment coefficient, whichever larger in numerical value.

According to such a configuration, it is possible to estimate noise according to the extent that stationary noise and non-stationary noise exist, without using the mixing coefficients and therefore, a high sound recognition rate can be achieved more easily.

(Supplementary Note 8)

The speech recognition system according to any one of Supplementary Note 5 to Supplementary Note 7 further including: a first speech input device that outputs an input sound as the first input signal and a second speech input device that outputs an input sound as the second input signal, wherein a target sound for noise reduction input to the first speech input device is larger than a target sound for noise reduction input to the second speech input device.

According to such a configuration, it is possible to achieve a higher sound recognition rate even when stationary noise from an air conditioner and non-stationary noise from a television set are generated.

(Supplementary Note 9)

A speech recognition system including: a first noise estimating unit that estimates a stationary noise component contained in a first input signal and outputs a first estimated noise; a first noise reduction unit that outputs a first estimated sound in which the stationary noise component is reduced from the first input signal using the first input signal and the first estimated noise from the first noise estimating unit; a second noise estimating unit that re-estimates a stationary noise component contained in the first input signal using at least the first input signal and the first estimated sound from the first noise reduction unit and outputs a second estimated noise; a third noise estimating unit that estimates a second non-stationary noise component including a sum of a stationary noise component and a non-stationary noise component contained in the first input signal using the first input signal and a second input signal and outputs a third estimated noise; an estimated noise combining unit that estimates a stationary noise component and a second non-stationary noise component contained in the first input signal using the second estimated noise from the second noise estimating unit and the third estimated noise from the third noise estimating unit; a second noise reduction unit that outputs a second estimated sound in which the stationary noise component and the second non-stationary noise component are reduced from the first input signal; a normalizing unit that normalizes the second estimated sound from the second noise reduction unit using the second estimated noise from the second noise estimating unit or the first estimated noise from the first noise estimating unit; a speech detection unit that detects a sound using the normalized sound from the normalizing unit; a third noise reduction unit that outputs a third estimated sound in which a stationary noise component is reduced from the first input signal using the first input signal and the second estimated noise from the second noise estimating unit; and a speech recognition unit that recognizes a sound by receiving the third estimated sound from the third noise reduction unit and the detection result from the speech detection unit.

(Supplementary Note 10)

The speech recognition system according to Supplementary Note 9, wherein the estimated noise combining unit estimates the stationary noise component and the second non-stationary noise component contained in the first input signal by multiplying the second estimated noise from the second noise estimating unit and the third estimated noise from the third noise estimating unit by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 11)

The speech recognition system according to Supplementary Note 9, wherein the estimated noise combining unit estimates noise contained in the first input signal by multiplying the second estimated noise from the second noise estimating unit and the third estimated noise from the third noise estimating unit by adjustment coefficients, respectively, and selecting the second estimated noise multiplied by the adjustment coefficient or the third estimated noise multiplied by the adjustment coefficient, whichever larger in numerical value.

(Supplementary Note 12)

The speech recognition system according to any one of Supplementary Note 9 to Supplementary Note 11 further including: a first speech input device that outputs an input sound as the first input signal and a second speech input device that outputs an input sound as the second input signal, wherein a target sound for noise reduction input to the first speech input device is larger than a target sound for noise reduction input to the second speech input device.

(Supplementary Note 13)

A noise reduction method including: estimating a stationary noise component contained in a first input signal; outputting a first estimated noise; outputting a first estimated sound in which the stationary noise component is reduced from the first input signal using the first input signal and the first estimated noise; re-estimating a stationary noise component contained in the first input signal using at least the first input signal and the first estimated sound; outputting a second estimated noise; estimating a second non-stationary noise component including a sum of a stationary noise component and a non-stationary noise component contained in the first input signal using the first input signal and a second input signal; outputting a third estimated noise; estimating a stationary noise component and a second non-stationary noise component contained in the first input signal using the second estimated noise and the third estimated noise; and outputting a second estimated sound in which the stationary noise component and the second non-stationary noise component are reduced from the first input signal.

(Supplementary Note 14)

The noise reduction method according to Supplementary Note 13 for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 15)

The noise reduction method according to Supplementary Note 13 for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 16)

The noise reduction method according to any one of Supplementary Note 13 to Supplementary Note 15 for inputting the first input signal and the second input signal so that a target sound for noise reduction contained in the first input signal is larger than a target sound for noise reduction contained in the second input signal.

(Supplementary Note 17)

A speech detection method including: estimating a stationary noise component contained in a first input signal; outputting a first estimated noise; outputting a first estimated sound in which the stationary noise component is reduced from the first input signal using the first input signal and the first estimated noise; re-estimating a stationary noise component contained in the first input signal using at least the first input signal and the first estimated sound; outputting a second estimated noise; estimating a second non-stationary noise component including a sum of a stationary noise component and a non-stationary noise component contained in the first input signal using the first input signal and a second input signal; outputting a third estimated noise; estimating a stationary noise component and a second non-stationary noise component contained in the first input signal using the second estimated noise and the third estimated noise; outputting a second estimated sound in which the stationary noise component and the second non-stationary noise component are reduced from the first input signal; and detecting a sound using a normalized sound in which the second estimated sound is normalized by the second estimated noise or the first estimated noise.

(Supplementary Note 18)

The speech detection method according to Supplementary Note 17 for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 19)

The speech detection method according to Supplementary Note 17 for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 20)

The speech detection method according to any one of Supplementary Note 17 to Supplementary Note 19 for inputting the first input signal and the second input signal so that a target sound for noise reduction contained in the first input signal is larger than a target sound for noise reduction contained in the second input signal.

(Supplementary Note 21)

A speech recognition method including: estimating a stationary noise component contained in a first input signal; outputting a first estimated noise; outputting a first estimated sound in which the stationary noise component is reduced from the first input signal using the first input signal and the first estimated noise; re-estimating a stationary noise component contained in the first input signal using at least the first input signal and the first estimated sound; outputting a second estimated noise; estimating a second non-stationary noise component including a sum of a stationary noise component and a non-stationary noise component contained in the first input signal using the first input signal and a second input signal; outputting a third estimated noise; estimating a stationary noise component and a second non-stationary noise component contained in the first input signal using the second estimated noise and the third estimated noise; outputting a second estimated sound in which the stationary noise component and the second non-stationary noise component are reduced from the first input signal; detecting a sound using a normalized sound in which the second estimated sound is normalized by the second estimated noise or the first estimated noise; and recognizing a sound by receiving the first estimated sound and the detection result.

(Supplementary Note 22)

The speech recognition method according to Supplementary Note 21 for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 23)

The speech recognition method according to Supplementary Note 21 for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 24)

The speech recognition method according to any one of Supplementary Note 21 to Supplementary Note 23 for inputting the first input signal and the second input signal so that a target sound for noise reduction contained in the first input signal is larger than a target sound for noise reduction contained in the second input signal.

(Supplementary Note 25)

A speech recognition method including: estimating a stationary noise component contained in a first input signal; outputting a first estimated noise; outputting a first estimated sound in which the stationary noise component is reduced from the first input signal using the first input signal and the first estimated noise; re-estimating a stationary noise component contained in the first input signal using at least the first input signal and the first estimated sound; outputting a second estimated noise; estimating a second non-stationary noise component including a sum of a stationary noise component and a non-stationary noise component contained in the first input signal using the first input signal and a second input signal; outputting a third estimated noise; estimating a stationary noise component and a second non-stationary noise component contained in the first input signal using the second estimated noise and the third estimated noise; outputting a second estimated sound in which the stationary noise component and the second non-stationary noise component are reduced from the first input signal; detecting a sound using a normalized sound in which the second estimated sound is normalized by the second estimated noise or the first estimated noise; outputting a third estimated sound in which a stationary noise component is reduced from the first input signal using the first input signal and the second estimated noise; and recognizing a sound by receiving the third estimated sound and the detection result.

(Supplementary Note 26)

The speech recognition method according to Supplementary Note 25 for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 27)

The speech recognition method according to Supplementary Note 25 for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 28)

The speech recognition method according to any one of Supplementary Note 25 to Supplementary Note 27 for inputting the first input signal and the second input signal so that a target sound for noise reduction contained in the first input signal is larger than a target sound for noise reduction contained in the second input signal.

(Supplementary Note 29)

A noise reduction program that causes a computer to execute: processing for estimating a stationary noise component contained in a first input signal and outputting a first estimated noise; processing for outputting a first estimated sound in which the stationary noise component is reduced from the first input signal using the first input signal and the first estimated noise; processing for re-estimating a stationary noise component contained in the first input signal using at least the first input signal and the first estimated sound and outputting a second estimated noise; processing for estimating a second non-stationary noise component including a sum of a stationary noise component and a non-stationary noise component contained in the first input signal using the first input signal and a second input signal and outputting a third estimated noise; processing for estimating a stationary noise component and a second non-stationary noise component contained in the first input signal using the second estimated noise and the third estimated noise; and processing for outputting a second estimated sound in which the stationary noise component and the second non-stationary noise component are reduced from the first input signal.

(Supplementary Note 30)

The noise reduction program according to Supplementary Note 29 that causes a computer to execute processing for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 31)

The noise reduction program according to Supplementary Note 29 that causes a computer to execute processing for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 32)

The noise reduction program according to any one of Supplementary Note 29 to Supplementary Note 31 that causes a computer to execute processing for inputting the first input signal and the second input signal so that a target sound for noise reduction contained in the first input signal is larger than a target sound for noise reduction contained in the second input signal.

(Supplementary Note 33)

A speech detection program that causes a computer to execute: processing for estimating a stationary noise component contained in a first input signal and outputting a first estimated noise; processing for outputting a first estimated sound in which the stationary noise component is reduced from the first input signal using the first input signal and the first estimated noise; processing for re-estimating a stationary noise component contained in the first input signal using at least the first input signal and the first estimated sound and outputting a second estimated noise; processing for estimating a second non-stationary noise component including a sum of a stationary noise component and a non-stationary noise component contained in the first input signal using the first input signal and a second input signal and outputting a third estimated noise; processing for estimating a stationary noise component and a second non-stationary noise component contained in the first input signal using the second estimated noise and the third estimated noise; processing for outputting a second estimated sound in which the stationary noise component and the second non-stationary noise component are reduced from the first input signal; and processing for detecting a sound using a normalized sound in which the second estimated sound is normalized by the second estimated noise or the first estimated noise.

(Supplementary Note 34)

The speech detection program according to Supplementary Note 33 that causes a computer to execute processing for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 35)

The speech detection program according to Supplementary Note 33 that causes a computer to execute processing for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 36)

The speech detection program according to any one of Supplementary Note 33 to Supplementary Note 35 that causes a computer to execute processing for inputting the first input signal and the second input signal so that a target sound for noise reduction contained in the first input signal is larger than a target sound for noise reduction contained in the second input signal.

(Supplementary Note 37)

A speech recognition program that causes a computer to execute: processing for estimating a stationary noise component contained in a first input signal and outputting a first estimated noise; processing for outputting a first estimated sound in which the stationary noise component is reduced from the first input signal using the first input signal and the first estimated noise; processing for re-estimating a stationary noise component contained in the first input signal using at least the first input signal and the first estimated sound and outputting a second estimated noise; processing for estimating a second non-stationary noise component including a sum of a stationary noise component and a non-stationary noise component contained in the first input signal using the first input signal and a second input signal and outputting a third estimated noise; processing for estimating a stationary noise component and a second non-stationary noise component contained in the first input signal using the second estimated noise and the third estimated noise; processing for outputting a second estimated sound in which the stationary noise component and the second non-stationary noise component are reduced from the first input signal; processing for detecting a sound using a normalized sound in which the second estimated sound is normalized by the second estimated noise or the first estimated noise; and processing for recognizing a sound by receiving the first estimated sound and the sound detection result.

(Supplementary Note 38)

The speech recognition program according to Supplementary Note 37 that causes a computer to execute processing for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 39)

The speech recognition program according to Supplementary Note 37 that causes a computer to execute processing for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 40)

The speech recognition program according to any one of Supplementary Note 37 to Supplementary Note 39 that causes a computer to execute processing for inputting the first input signal and the second input signal so that a target sound for noise reduction contained in the first input signal is larger than a target sound for noise reduction contained in the second input signal.

(Supplementary Note 41)

A speech recognition program that causes a computer to execute: processing for estimating a stationary noise component contained in a first input signal and outputting a first estimated noise; processing for outputting a first estimated sound in which the stationary noise component is reduced from the first input signal using the first input signal and the first estimated noise; processing for re-estimating a stationary noise component contained in the first input signal using at least the first input signal and the first estimated sound and outputting a second estimated noise; processing for estimating a second non-stationary noise component including a sum of a stationary noise component and a non-stationary noise component contained in the first input signal using the first input signal and a second input signal and outputting a third estimated noise; processing for estimating a stationary noise component and a second non-stationary noise component contained in the first input signal using the second estimated noise and the third estimated noise; processing for outputting a second estimated sound in which the stationary noise component and the second non-stationary noise component are reduced from the first input signal; processing for detecting a sound using a normalized sound in which the second estimated sound is normalized by the second estimated noise or the first estimated noise; processing for outputting a third estimated sound in which a stationary noise component is reduced from the first input signal using the first input signal and the second estimated noise; and processing for recognizing a sound by receiving the third estimated sound and the sound detection result.

(Supplementary Note 42)

The speech recognition program according to Supplementary Note 41 that causes a computer to execute processing for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

(Supplementary Note 43)

The speech recognition program according to Supplementary Note 41 that causes a computer to execute processing for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

(Supplementary Note 44)

The speech recognition program according to any one of Supplementary Note 41 to Supplementary Note 43 that causes a computer to execute processing for inputting the first input signal and the second input signal so that a target sound for noise reduction contained in the first input signal is larger than a target sound for noise reduction contained in the second input signal.

This application is based upon and claims the benefit of priority from Japanese patent application No. 2013-006044, filed on Jan. 17, 2013, the disclosure of which is incorporated herein in its entirety by reference.

While the present invention has been described with reference to exemplary embodiments thereof, the present invention is not limited to these exemplary embodiments. The constitution and details of the present invention can be subjected to various modifications which can be understood by those skilled in the art, without departing from the scope of the present invention.

REFERENCE SIGNS LIST 101 first mic
102 second mic
111 first noise estimating unit
112 second noise estimating unit
113 third noise estimating unit
114 estimated noise combining unit
121 first noise reduction unit
122 second noise reduction unit
123 third noise reduction unit
131 normalizing unit
132 speech detection unit
133 speech recognition unit
200 terminal
201 touch panel
300 speaker
400 air conditioner
500 television set
611 first noise estimating unit
612 second noise estimating unit
621 first noise attenuation unit
622 second noise attenuation unit
631 sound pattern storage unit

The invention claimed is:

1. A noise reduction system that reduces noise contained in a sound mixed with noise, the noise reduction system comprising:
hardware, including a processor and memory;
a first noise estimating unit implemented at least by the hardware and that estimates a stationary noise component contained in a first input signal and outputs a first estimated noise;
a first noise reduction unit implemented at least by the hardware and that outputs a first estimated sound in which the stationary noise component is reduced from the first input signal using the first input signal and the first estimated noise from the first noise estimating unit;
a second noise estimating unit implemented at least by the hardware and that re-estimates a stationary noise component contained in the first input signal using at least the first input signal and the first estimated sound from the first noise reduction unit and outputs a second estimated noise;
a third noise estimating unit implemented at least by the hardware and that estimates a second non-stationary noise component including a sum of a stationary noise component and a non-stationary noise component contained in the first input signal using the first input signal and a second input signal and outputs a third estimated noise;
an estimated noise combining unit implemented at least by the hardware and that estimates a stationary noise component and a second non-stationary noise component contained in the first input signal using the second estimated noise from the second noise estimating unit and the third estimated noise from the third noise estimating unit; and a second noise reduction unit implemented at least by the hardware and that reduces the stationary noise component and the second non-stationary noise component contained in the first input signal.

2. The noise reduction system according to claim 1, wherein the estimated noise combining unit estimates the stationary noise component and the second non-stationary noise component contained in the first input signal by multiplying the second estimated noise from the second noise estimating unit and the third estimated noise from the third noise estimating unit by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

3. The noise reduction system according to claim 1, wherein the estimated noise combining unit estimates noise contained in the first input signal by multiplying the second estimated noise from the second noise estimating unit and the third estimated noise from the third noise estimating unit by adjustment coefficients, respectively, and selecting the second estimated noise multiplied by the adjustment coefficient or the third estimated noise multiplied by the adjustment coefficient, whichever larger in numerical value.

4. The noise reduction system according to claim 1, further comprising:

a first speech input device implemented at least by the hardware and that outputs an input sound as the first input signal; and a second speech input device implemented at least by the hardware and that outputs an input sound as the second input signal, wherein a target sound for noise reduction input to the first speech input device is larger than a target sound for noise reduction input to the second speech input device.

5. A speech detection system that detects a sound, the system comprising:

hardware, including a processor and memory;

a first noise estimating unit implemented at least by the hardware and that estimates a stationary noise component contained in a first input signal and outputs a first estimated noise;

a first noise reduction unit implemented at least by the hardware and that outputs a first estimated sound in which the stationary noise component is reduced from the first input signal using the first input signal and the first estimated noise from the first noise estimating unit;

a second noise estimating unit implemented at least by the hardware and that re-estimates a stationary noise component contained in the first input signal using at least the first input signal and the first estimated sound from the first noise reduction unit and outputs a second estimated noise;

a third noise estimating unit implemented at least by the hardware and that estimates a second non-stationary noise component including a sum of a stationary noise component and a non-stationary noise component contained in the first input signal using the first input signal and a second input signal and outputs a third estimated noise;

an estimated noise combining unit implemented at least by the hardware and that estimates a stationary noise component and a second non-stationary noise component contained in the first input signal using the second estimated noise from the second noise estimating unit and the third estimated noise from the third noise estimating unit;

a second noise reduction unit implemented at least by the hardware and that outputs a second estimated sound in which the stationary noise component and the second non-stationary noise component are reduced from the first input signal;

a normalizing unit implemented at least by the hardware and that normalizes the second estimated sound from the second noise reduction unit using the second estimated noise from the second noise estimating unit or the first estimated noise from the first noise estimating unit; and a speech detection unit that detects a sound using the normalized sound from the normalizing unit.

6. The speech detection system according to claim 5, wherein the estimated noise combining unit estimates the stationary noise component and the second non-stationary noise component contained in the first input signal by multiplying the second estimated noise from the second noise estimating unit and the third estimated noise from the third noise estimating unit by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

7. The speech detection system according to claim 5, wherein the estimated noise combining unit estimates noise contained in the first input signal by multiplying the second estimated noise from the second noise estimating unit and the third estimated noise from the third noise estimating unit by adjustment coefficients, respectively, and selecting the second estimated noise multiplied by the adjustment coefficient or the third estimated noise multiplied by the adjustment coefficient, whichever larger in numerical value.

8. The speech detection system according to claim 5, further comprising:

a first speech input device that outputs an input sound as the first input signal and a second speech input device that outputs an input sound as the second input signal, wherein a target sound for noise reduction input to the first speech input device is larger than a target sound for noise reduction input to the second speech input device.

9. A speech detection method including:

estimating a stationary noise component contained in a first input signal;

outputting a first estimated noise;
outputting a first estimated sound in which the stationary noise component is reduced from the first input signal using the first input signal and the first estimated noise;
re-estimating a stationary noise component contained in the first input signal using at least the first input signal and the first estimated sound;
outputting a second estimated noise;
estimating a second non-stationary noise component including a sum of a stationary noise component and a non-stationary noise component contained in the first input signal using the first input signal and a second input signal;
outputting a third estimated noise;
estimating a stationary noise component and a second non-stationary noise component contained in the first input signal using the second estimated noise and the third estimated noise;
outputting a second estimated sound in which the stationary noise component and the second non-stationary noise component are reduced from the first input signal; and
detecting a sound using a normalized sound in which the second estimated sound is normalized by the second estimated noise or the first estimated noise.

10. The speech detection method according to claim 9 for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

11. The speech detection method according to claim 9 for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

12. The speech detection method according to claim 9 for inputting the first input signal and the second input signal so that a target sound for noise reduction contained in the first input signal is larger than a target sound for noise reduction contained in the second input signal.

13. A non-transitory computer readable medium having embodied thereon a speech detection program that when executed by a computer causes the computer to execute:
processing for estimating a stationary noise component contained in a first input signal and outputting a first estimated noise;
processing for outputting a first estimated sound in which the stationary noise component is reduced from the first input signal using the first input signal and the first estimated noise;
processing for re-estimating a stationary noise component contained in the first input signal using at least the first input signal and the first estimated sound and outputting a second estimated noise;
processing for estimating a second non-stationary noise component including a sum of a stationary noise component and a non-stationary noise component contained in the first input signal using the first input signal and a second input signal and outputting a third estimated noise;
processing for estimating a stationary noise component and a second non-stationary noise component contained in the first input signal using the second estimated noise and the third estimated noise;
processing for outputting a second estimated sound in which the stationary noise component and the second non-stationary noise component are reduced from the first input signal; and
processing for detecting a sound using a normalized sound in which the second estimated sound is normalized by the second estimated noise or the first estimated noise.

14. The non-transitory computer readable medium according to claim 13, wherein when executed by a computer, the speech detection program causes the computer to execute processing for estimating a stationary noise component and a second non-stationary noise component contained in the first input signal by multiplying the second estimated noise and the third estimated noise by adjustment coefficients, respectively, controlling mixing coefficients for mixing the second estimated noise multiplied by the adjustment coefficient and the third estimated noise multiplied by the adjustment coefficient according to magnitudes of the second estimated noise multiplied by the adjustment coefficient and the third estimated noise multiplied by the adjustment coefficient, and multiplying the second estimated noise multiplied by the adjustment coefficient and the third estimated noise multiplied by the adjustment coefficient by the mixing coefficients, respectively, followed by adding the resulting multiplied noises.

15. The non-transitory computer readable medium according to claim 13, wherein when executed by a computer, the speech detection program causes the computer to execute processing for estimating noise contained in the first input signal by multiplying the second estimated noise and the third estimated noise by adjustment coefficients, respectively, and selecting the second estimated noise multiplied by the adjustment coefficient or the third estimated noise multiplied by the adjustment coefficient, whichever larger in numerical value.

16. The non-transitory computer readable medium according to claim 13, wherein when executed by a computer, the speech detection program causes the computer to execute processing for inputting the first input signal and the second input signal so that a target sound for noise reduction contained in the first input signal is larger than a target sound for noise reduction contained in the second input signal.

17. A speech recognition system that recognizes a sound, the system comprising:
hardware, including a processor and memory;
a first noise estimating unit implemented at least by the hardware and that estimates a stationary noise component contained in a first input signal and outputs a first estimated noise;
a first noise reduction unit implemented at least by the hardware and that outputs a first estimated sound in which the stationary noise component is reduced from the first input signal using the first input signal and the first estimated noise from the first noise estimating unit;
a second noise estimating unit implemented at least by the hardware and that re-estimates a stationary noise component contained in the first input signal using at least the first input signal and the first estimated sound from the first noise reduction unit and outputs a second estimated noise;

a third noise estimating unit implemented at least by the hardware and that estimates a second non-stationary noise component including a sum of a stationary noise component and a non-stationary noise component contained in the first input signal using the first input signal and a second input signal and outputs a third estimated noise;

an estimated noise combining unit implemented at least by the hardware and that estimates a stationary noise component and a second non-stationary noise component contained in the first input signal using the second estimated noise from the second noise estimating unit and the third estimated noise from the third noise estimating unit;

a second noise reduction unit implemented at least by the hardware and that outputs a second estimated sound in which the stationary noise component and the second non-stationary noise component are reduced from the first input signal;

a normalizing unit implemented at least by the hardware and that normalizes the second estimated sound from the second noise reduction unit using the second estimated noise from the second noise estimating unit or the first estimated noise from the first noise estimating unit;

a speech detection unit implemented at least by the hardware and that detects a sound using the normalized sound from the normalizing unit; and a speech recognition unit implemented at least by the hardware and that recognizes a sound by receiving the first estimated sound from the first noise reduction unit and the detection result from the speech detection unit.

18. The speech recognition system according to claim 17, further comprising:

a third noise reduction unit implemented at least by the hardware and that outputs a third estimated sound in which a stationary noise component is reduced from the first input signal using the first input signal and the second estimated noise from the second noise estimating unit; wherein a speech recognition unit recognizes a sound by receiving the third estimated sound from the third noise reduction unit and the detection result from the speech detection unit.

19. The speech recognition system according to claim 17, wherein the estimated noise combining unit estimates noise contained in the first input signal by multiplying the second estimated noise from the second noise estimating unit and the third estimated noise from the third noise estimating unit by adjustment coefficients, respectively, and selecting the second estimated noise multiplied by the adjustment coefficient or the third estimated noise multiplied by the adjustment coefficient, whichever larger in numerical value.

20. The speech recognition system according to claim 17, further comprising:

a first speech input device implemented at least by the hardware and that outputs an input sound as the first input signal and a second speech input device that outputs an input sound as the second input signal, wherein a target sound for noise reduction input to the first speech input device is larger than a target sound for noise reduction input to the second speech input device.

* * * * *